United States Patent [19]

Kyoto et al.

[11] Patent Number: 4,969,941
[45] Date of Patent: Nov. 13, 1990

[54] FURNACE FOR HEATING GLASS PREFORM FOR OPTICAL FIBER AND METHOD FOR PRODUCING GLASS PREFORM

[75] Inventors: Michihisa Kyoto; Yoichi Ishiguro; Ichiro Tsuchiya, all of Yokohama, Japan

[73] Assignee: Sumitomo Electric Industries, Ltd., Osaka, Japan

[21] Appl. No.: 274,995

[22] PCT Filed: Feb. 16, 1988

[86] PCT No.: PCT/JP88/00151
§ 371 Date: Oct. 6, 1988
§ 102(e) Date: Oct. 6, 1988

[87] PCT Pub. No.: WO88/06145
PCT Pub. Date: Aug. 25, 1988

[30] Foreign Application Priority Data

| Feb. 16, 1987 | [JP] | Japan | 62-34769 |
| Feb. 16, 1987 | [JP] | Japan | 62-34770 |
| Feb. 16, 1987 | [JP] | Japan | 62-34771 |
| Feb. 16, 1987 | [JP] | Japan | 62-34772 |
| Jun. 11, 1987 | [JP] | Japan | 62-144035 |
| Jun. 15, 1987 | [JP] | Japan | 62-148769 |

[51] Int. Cl.⁵ .................................... C03B 37/014
[52] U.S. Cl. .................................... 65/18.1; 65/18.3; 65/30.1; 65/157; 65/374.15; 65/DIG. 16
[58] Field of Search ............... 65/1, 2, 3.12, 18.2, 65/60.6, 374.11, 374.13, 374.15, 3.11, 900, DIG. 16, 12, 13, 144, 18.1, 18.3, 33, 30.1, 157

[56] References Cited

U.S. PATENT DOCUMENTS 4,586,943  5/1986  Kyoto et al. .................... 65/3.12

FOREIGN PATENT DOCUMENTS

| 0232077 | 8/1987 | European Pat. Off. . |
| 2401103 | 3/1979 | France . |
| 60-145923 | 8/1985 | Japan . |
| 61-201634 | 9/1986 | Japan . |
| 61-215226 | 9/1986 | Japan . |
| 1575299 | 9/1980 | United Kingdom . |
| 2203737 | 10/1988 | United Kingdom . |

Primary Examiner—Joye L. Woodard
Attorney, Agent, or Firm—Cushman, Darby & Cushman

[57] ABSTRACT

A heating furnace for heating a porous preform made of fine particles of quartz base glass for an optical fiber in an atmosphere comprising a fluorine-containing atmosphere to add fluorine to the preform and to vitrify the preform to produce a glass preform for an optical fiber, which comprises a heater and a muffle tube positioned inside the heater to separate a heating atmosphere from the heater, wherein at least the inner layer of the muffle tube consists of highly pure carbon.

10 Claims, 10 Drawing Sheets

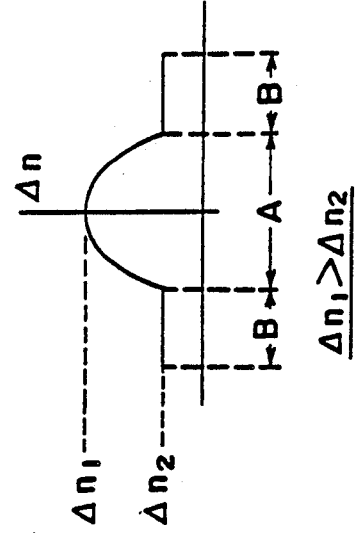
FIG. 1A
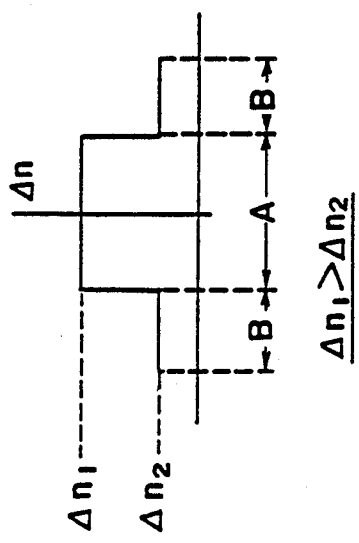
FIG. 1B
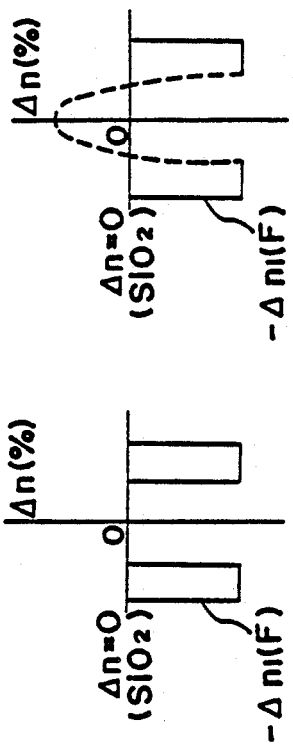
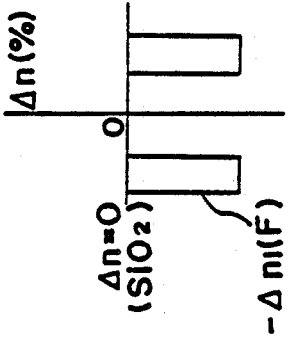
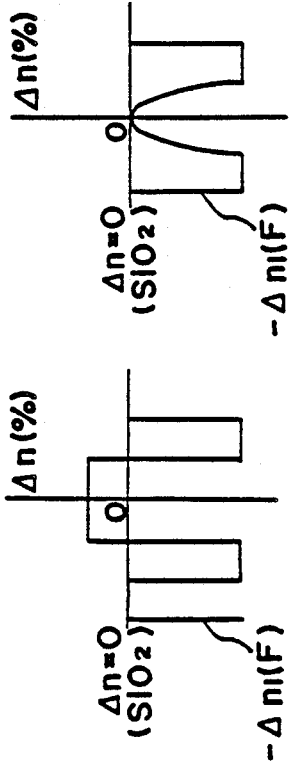

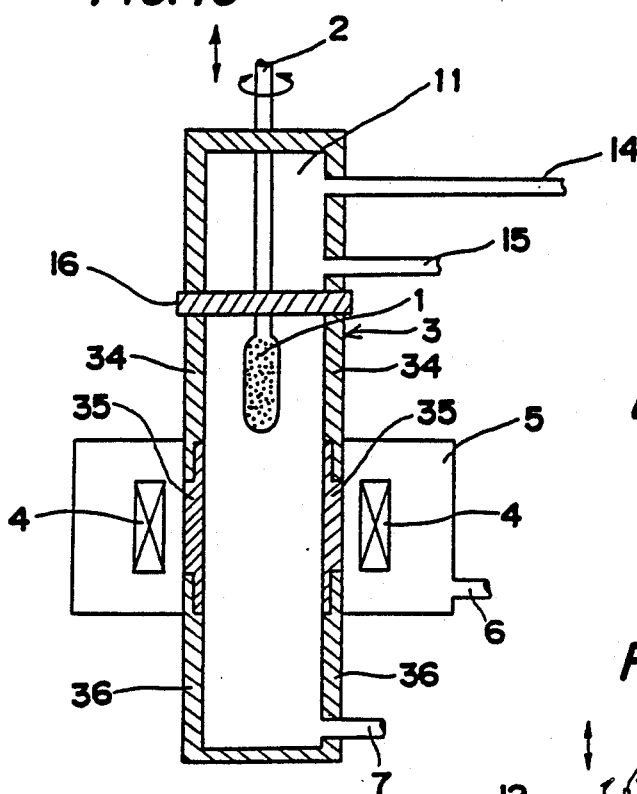
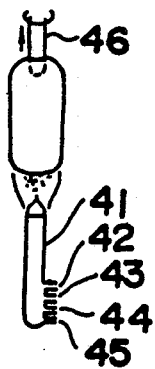
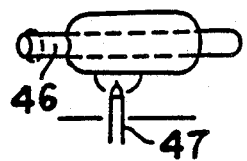
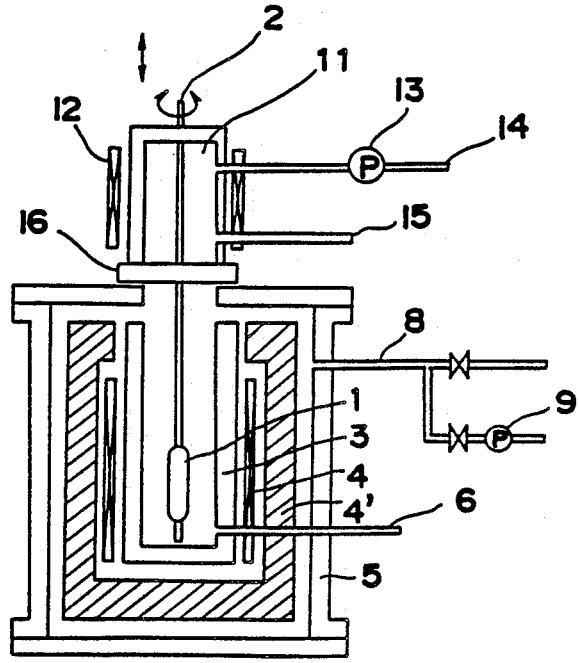
FIG. 10
FIG. 12A
FIG. 12B
FIG. 11

FURNACE FOR HEATING GLASS PREFORM FOR OPTICAL FIBER AND METHOD FOR PRODUCING GLASS PREFORM

FIELD OF THE INVENTION

The present invention relates to a furnace for heating a glass preform for an optical fiber and a method for producing such glass preform. More particularly, it relates to a heating furnace and a method for heating a porous glass preform consisting of fine particles of quartz glass to add fluorine to the preform and vitrify it. The heating furnace of the present invention can prevent contamination of the glass preform with impurity elements and has good durability.

BACKGROUND ARTS

As one of general methods for mass producing a glass preform for use in the fabrication of an optical fiber, the VAD (Vapor Phase Axial Deposition) method is known. The VAD method comprises depositing fine particles of glass generated in oxyhydrogen flame on a rotating starting member such as a glass plate or rod to form a cylindrical porous preform (soot preform) and sintering said porous preform to obtain a transparent glass preform for use in the fabrication of an optical fiber.

In the VAD method, for sintering the porous preform to convert it into transparent glass, the preform should be heated in an atmosphere of an inert gas (e.g. helium and argon) to a temperature of 1,600° C. or higher. As a heating furnace for sintering the preform, usually a heating furnace having a carbon heater is used. What should be taken care of when sintering the preform in such heating furnace is inclusion of transition metals such as copper or iron and water. When 1 (one) ppb or larger of the transition metal is included in the glass preform, transmission loss wavelength characteristics of the fabricated optical fiber is greatly deteriorated in an entire wavelength range. When 0.1 ppm or larger of water is included in the preform, the characteristics of the fabricated optical fiber is impaired in a longer wavelength range.

Therefore, the porous preform is usually dehydrated before or during vitrification. As a dehydration method, it is known to heat the porous preform at a high temperature in an atmosphere of an inert gas containing a chlorine-containing gas, a fluorine-containing gas, etc. When the fluorine-containing gas is used, not only the porous preform is dehydrated but also fluorine is added to the porous preform. When the fluorine is added to the porous preform, a refractive index profile which is essential to the optical fiber is advantageously adjusted. In this connection, Japanese Patent Publication No. 15682/1980 and Japanese Patent Kokai Publication No. 67533/1980 can be referred. These publications will be discussed below.

The treatment with the fluorine-containing gas is carried out in the heating furnace before or simultaneously with vitrification. To prevent wastage of the carbon heater due to moisture or oxygen which is generated during heating of the preform, a muffle tube is installed for separating the carbon heater and the sintering atmosphere. As the muffle tube, an alumina made one is conventionally used (cf. Japanese Patent Publication No. 40096/1982 and U.S. Pat. No. 4,338,111). However, when the alumina made muffle tube is used, alkali components contained in alumina float in the heating atmosphere at high temperature and adhere to a surface of the porous preform to form a cristobalite layer.

Then, a quartz made muffle tube has been practically used. In comparison with the alumina made muffle tube, the use of the quartz made muffle tube gives following advantages:

1. The quartz has better mechanical processing accuracy and therefore airtightness of the atmosphere is maintained so that the soot preform is effectively dehydrated.
2. The quartz made muffle tube contains few impurities such as iron and alkali and is much purer than the alumina made muffle tube.
3. The glass preform produced by means of the quartz made muffle tube does not suffer from surface devitrification caused by alkali.
4. The quartz made muffle tube hardly suffers from thermal breakage (breakage due to thermal shock).
5. When the fluorine-containing gas is used, no contaminating gas such as $AlF_3$ and the like is generated. Although gaseous $SiF_4$ is generated, it does not act as an impurity which has adverse influence on the glass preform.

The methods utilizing the quartz made muffle tube are described in detail in Japanese Patent Publication Nos. 58299/1983 and 42136/1983 and Japanese Patent Kokai Publication No. 86049/1985.

If copper and iron are contained in the quartz glass, they easily react with the chlorine-containing gas contained in the dehydration atmosphere according to the following reaction formulae to form volatile chlorides, which penetrate into the porous preform and severely deteriorate the transmission loss characteristics of the finally fabricated optical fiber. This is a new problem associated with the quartz made muffle tube.

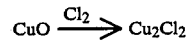

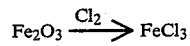

Another problem is that, since copper tends to easily diffuse in the quartz glass at a high temperature, copper which is liberated from the heating furnace itself or the heater penetrates through the muffle tube and contaminates the glass preform.

Further, the fluorine-containing gas is decomposed or reacts to form $F_2$ gas or HF gas. These gases react with the quartz glass according to the following reaction formulae to generate $SiF_4$ gas, and by these reactions, the quartz glass is etched:

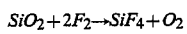

Because of such etching, copper and iron present inside the quartz glass appear on the surface and contaminate the porous preform. In addition, by etching, pin holes are formed in the quartz made muffle tube, which is a cause of intake of environmental air or leakage of the dehydration atmosphere. These are not advantageous for the production method.

Furthermore, the quartz glass tube has a very bad problem that it tends to easily deform at a high temperature. That is, when the quartz glass is kept at about 1,300° C. for a long time, it deforms due to viscous flow. In addition, when it is used at a temperature of 1,150° C. or higher for a long time, it is devitrified, and once the furnace temperature is lowered, strain is generated due to difference of thermal expansion coefficient between the glass phase and the devitrified phase and finally breaks the tube.

Meanwhile, the glass preform for the optical fiber comprises a core part and a cladding part, and the core part occupies a center portion of the glass preform and has a higher refractive index than the cladding part so as to transmit light. In refractive index structures of a single mode optical fiber and a multi-mode fiber shown in FIG. 1A and 1B, respectively, "A" part and "B" part correspond to the core part and the cladding part, respectively.

To form refractive index difference between the core and the cladding, the refractive index of the core is increased and/or that of the cladding is decreased.

"Refractive index difference" herein used is intended to mean a difference of refractive index between a certain glass and a pure silica.

To increase the refractive index of the core part, a refractive index increasing dopant such as $GeO_2$, $Al_2O_3$ and $TiO_2$ is added to a glass forming raw material during synthesis of the quartz glass so that an element such as Ge, Al and Ti is added to the glass. However, if such metal oxide is used, following defects will arise:

In proportional to the increase of the amount of the added dopant, light scattering (Rayleigh scattering) due to the dopant, which is not preferable for light scattering, increases. If a large amount of the dopant is added, bubbles or crystalline phases are generated in the glass preform. For example, when $GeO_2$ is used, bubbles of GeO gas tends to form, and when $Al_2O_3$ is used, clusters of $Al_2O_3$ tends to form. Such bubbles or crystalline phases have undesired influence on light transmission characteristics and also strength of the optical fiber.

Therefore, it is understood that a composition of the core part preferably consists of the pure quartz glass or quartz base glass containing the dopant in an as small as possible amount.

As one of measures for achieving the refractive index difference between the core part and the cladding part with overcoming the above various drawbacks associated with the addition of the dopant to the core part, it is proposed to provide a glass preform for an optical fiber comprising a cladding part to which fluorine, which decreases the refractive index, is added. One of the advantages achieved by the use of fluorine as the dopant is that the core part can be made of the pure quartz or quartz base glass containing an as small as possible amount of the dopant since the refractive index of the cladding can be made lower than that of the pure quartz. FIGS. 2A-2D show a refractive index structure of the quartz base glass optical fiber comprising a cladding to which fluorine is added. By such structure, light scattering (Rayleigh scattering) due to the dopant contained in the core through which light propagates is reduced and the core has preferable properties as a light transmitting guide.

Further, a resource for fluorine is richer than that for other dopants such as $GeO_2$, and purification of a raw material is easy, which is economically advantageous. In addition, the fluorine gas not only acts as the dopant for adjusting the refractive index of the glass but also acts as an excellent dehydrant for removing moisture contained in the soot preform. This is also one of the characteristics of fluorine.

For adding (or doping) fluorine to the quartz glass, several methods have been proposed.

Firstly, Japanese Patent Publication No. 15682/1980 describes a method comprising supplying the fluorine-containing gas in a gaseous phase synthesis of glass so as to add fluorine to the glass. Although this method can add fluorine to the glass, it has such drawbacks that a glass deposition efficiency and fluorine addition efficiency (doping yield) are both low. The reason for this may be that in the flame hydrolysis which utilizes oxy-hydrogen flame, moisture in the flame and the fluorine-containing gas such as $SF_6$ react according the reaction formula (1) to generate hydrogen fluoride (HF) gas:

$$SF_6 + 3H_2O \rightarrow SO_3 + 6HF \qquad (1)$$

Since the generated HF gas is stable, almost all the fluorine-containing gas is converted to the HF gas at high temperature as long as the moisture is present, and only a slight amount of the remaining fluorine-containing gas is used as the dopant.

The HF gas etches the glass, particularly quartz and reacts with the fine particles of the glass synthesized in the flame according to the following reaction formulae (2) and (3):

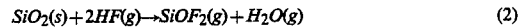

$$SiO_2(s) + 2HF(g) \rightarrow SiOF_2(g) + H_2O(g) \qquad (2)$$

$$SiO_2(s) + 4HF(g) + 2H_2O(g) \qquad (3)$$

wherein (s) and (g) stand for a gas and a solid, respectively. Thereby, the synthesized fine particles of the glass are consumed so that the deposition efficiency is decreased.

Accordingly, increase of addition of the fluorine-containing gas results in decrease of the deposition rate of the soot particles.

Secondly, Japanese Patent Kokai Publication No. 67533/1980 discloses a method comprising synthesizing fine particles of the glass by flame hydrolysis, depositing them to form a soot preform, heating the formed soot preform in an atmosphere comprising a fluorine-containing gas to dope fluorine to the soot whereby a glass preform containing the fluorine is produced.

However, this method also has several drawbacks. In one embodiment of the method described in said Japanese Patent Kokai Publication, the soot preform is heated in the atmosphere comprising the fluorine-containing gas at a temperature of not higher that 1,000° C. However, the addition rate of the fluorine is low and sometimes copper and iron are present in the finally fabricated optical fiber. Copper and iron are know to cause absorption loss which is a cause of increase of transmission loss.

It is also described to treat the soot preform in the gaseous atmosphere comprising the fluorine-containing gas at a temperature of not lower than 1,400° C. However, a surface of the produced glass preform is etched, and also the muffle tube such as the quartz made muffle tube for maintaining the atmosphere is sometimes severely damaged by etching. Such etching of the muffle tube is one of the causes for increasing contamination of the soot preform with the impurities in the muffle tube.

In addition, the fabricated optical fiber in said Japanese Patent Kokai Publication suffers from change of absorption loss with time due to hydroxyl groups, and the absorption loss greatly increases at high temperature.

To overcome such problems, Japanese Patent Kokai Publication No. 239337/1985 discloses a method in which $SiF_4$ is used as the fluorine-containing gas.

$SiF_4$ is only one fluorine-containing gas which does not etch the soot preform and the quartz glass made muffle tube so that it does not induce the breakage of the quartz glass made muffle tube due to etching.

However, in addition to the above described drawbacks, the quartz glass made muffle tube has following drawbacks. Through the quartz, impurities such as alkali and copper penetrate. If a slight amount of water is present, it reacts with $SiF_4$ to form HF which etches the quartz glass made muffle tube so that the impurities contained in the muffle tube material may contaminate the soot preform. Penetration of the impurities can be prevented by lining the whole muffle tube with a highly pure material. But, the lining increases the production cost of the muffle tube and is uneconomical. To prevent the etching of the muffle tube, the soot preform and the muffle tube are thoroughly dried to remove the moisture before the supply of $SiF_4$ in the muffle tube, which requires an airtight equipment or careful operation.

As a material which hardly reacts with the fluorine-containing gas or the chlorine-containing gas, carbon is contemplated. The carbon does not either react with $SF_6$, $C_2F_6$, $CF_4$ and the like which easily react with the quartz. Of course, the carbon does not react with $SiF_4$. Japanese Patent Publication No. 28852/1981 suggests the use of a carbon made muffle tube in an atmosphere comprising the fluorine-containing gas such as $F_2$, although no working example is described.

However, the carbon has following drawbacks:

1. Since the carbon has minute pores, gases can penetrate therethrough. Permeability of nitrogen through the carbon is $10^6$ times larger than through the quarts glass.

2. The carbon is easily oxidized and, at a temperature not lower than 400° C., it easily reacts with oxygen to form $CO_2$ or CO.

To prevent oxidation, it has been proposed to form a layer of ceramics such as SiC, $Al_2O_3$ and BN on an inner wall of the carbon muffle tube. Although the ceramics layer prevents the oxidation, it disadvantageously reacts with at least one of the chlorine-containing gas and the fluorine-containing gas. Impurities generated by such reaction devitrify the soot preform and generate bubbles in the soot preform.

Although $F_2$ gas has no possibility to liberate carbon or sulfur, it explosively reacts with water. Therefore, the $F_2$ gas is not suitable as a fluorine-doping gas.

Since the carbon is a material having large gas permeability as described above, the gas goes in and out through the wall of the muffle tube so that the moisture in the air penetrates into the muffle tube through the wall. Therefore, the glass preform contains a comparatively large amount of water and in turn the hydroxyl groups. In addition, the gasses such as $Cl_2$ and $SiF_4$ are released outside the furnace and may pollute a work environment, and impurities (e.g. copper and iron) may penetrate into the furnace from the outside. These defects can be considerably overcome by increasing the thickness of carbon, but still not completely.

As explained above, the addition of fluorine to the quartz glass of the cladding part by the conventional methods encounters various difficulties.

In view of such circumstances, the present invention intends to solve the problems of the conventional muffle tube which is used in dehydration of the preform for the optical fiber and addition of the fluorine to the preform and to provide a muffle tube for producing the glass preform for the optical fiber, which has improved durability and long life and can prevent the penetration of the air into the muffle tube.

DETAILED DESCRIPTION OF THE INVENTION

As a result of the extensive study to solve the above described problems, it has been found that when an inner wall of a muffle tube consists of a carbon layer, the muffle tube is not deteriorated even if a corrosive gas such as the fluorine-containing gas and the chlorine-containing gas is supplied at high temperature. This is because the muffle tube does not react with the fluorine-containing gas or the chlorine-containing gas since the inner wall is coated with the carbon layer. Thus, such the muffle tube has a much longer life than the conventional ones.

Accordingly, the present invention provides a heating furnace for heating a porous preform made of fine particles of quartz base glass for an optical fiber in an atmosphere comprising a fluorine-containing atmosphere to add fluorine to the preform and to vitrify the preform to produce a glass preform for an optical fiber, which comprises a heater and a muffle tube positioned inside the heater to separate a heating atmosphere from the heater, wherein at least the inner layer of the muffle tube consists of highly pure carbon.

BRIEF DESCRIPTION OF THE DRAWINGS

FIGS. 1A and 1B show general structures of a single mode optical fiber and a multi-mode optical fiber, respectively, FIGS. 2A–2D show a structure of a low dispersion type optical fiber comprising a cladding to which fluorine is added, FIG. 3 schematically shows a cross section of one example of the first embodiment of the heating furnace for the preform of the optical fiber according to the present invention, FIG. 4 schematically shows a cross section of another example of the first embodiment of the heating furnace according to the present invention, FIG. 5 schematically shows a cross section of the second embodiment of the heating furnace for the preform of the optical fiber according to the present invention, FIG. 6 schematically shows a cross section of the third embodiment of the heating furnace for the preform of the optical fiber according to the present invention, FIG. 7 schematically shows a cross section of the pressurized heating furnace, FIG. 8 schematically shows an apparatus used in the experiment for measuring an amount of inflow air, FIGS. 12A and 12B illustrate methods for producing a soot preform by flame hydrolysis.

DETAILED DESCRIPTION OF THE PREFERRED EMBODIMENTS

Figure 3:
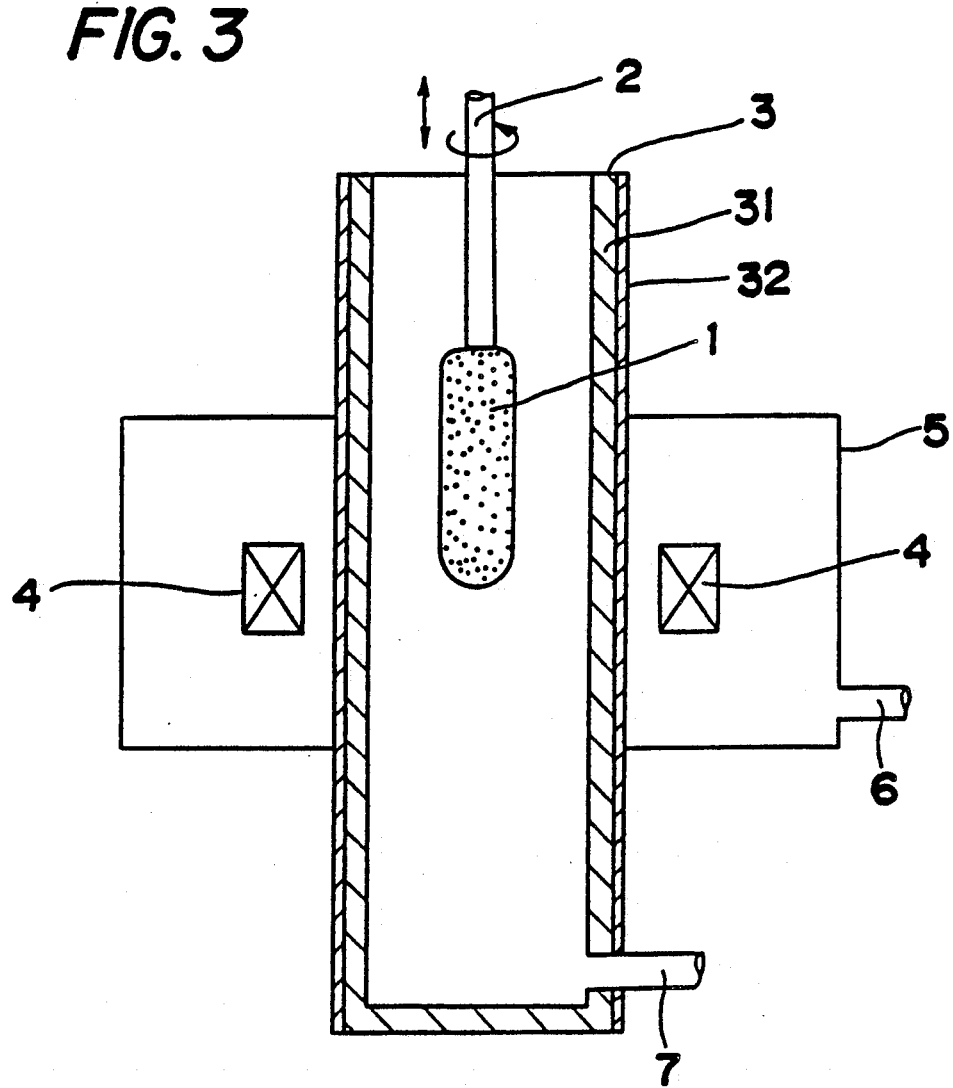

In the present invention, a porous glass preform consisting of fine particles of the quartz base glass (hereinafter, occasionally referred to as "soot preform") typically includes soot preforms having the following structures:

1. A solid or hollow soot preform the entire of which consists of fine particles of the glass. In case of the former, after vitrifying the soot preform, a bore is formed at a center part, and then a glass rod is inserted in the bore to produce a final glass preform.

2. A soot preform comprising a glass core and fine particles of the glass deposited around the core.

3. A soot preform comprising a glass core around which a part of the cladding has been formed and fine particles of the glass deposited around the cladding.

In the first embodiment of the present invention, the muffle tube comprises an inner layer made of the carbon and an outer layer of silicon carbide. Preferred examples of such muffle tube are a carbon made muffle tube an outer wall of which is coated with silicon carbide and a silicon carbide made muffle tube an inner wall of which is coated with the carbon.

Generally, purity of the carbon is such degree that a total ash content is not larger than 50 ppm, preferably not larger than 20 ppm. The carbon having the total ash content of 1,000 ppm cannot be used for making the muffle tube in view of the impurities such as iron and copper. The impurities and their amounts contained in the carbon having the total ash content of 20 ppm or less are as shown in following Table.

TABLE 1

| B  | <0.1 ppm | Ca | <0.1 ppm |
|----|----------|----|----------|
| Mg | <0.1 ppm | Ti | <0.1 ppm |
| Al | <0.1 ppm | V  | <0.1 ppm |
| Si | <0.8 ppm | Cr | <0.1 ppm |
| P  | <0.2 ppm | Fe | <0.1 ppm |
| S  | <0.1 ppm | Cu | <0.1 ppm |
| Ni | <0.1 ppm |    |          |

As silicon carbide, one containing iron in an amount of several ppm or less and copper in an amount of 1 ppm or less is preferably used.

When the muffle tube of the present invention is used, as the fluorine-containing gas, silicon fluorides (e.g. $SiF_4$, $Si_2F_6$, etc.) and carbon fluorides (e.g. $CF_4$, $C_2F_6$, $C_3F_8$, $CCl_2F_2$, etc.) are preferred. Among them, $SiF_4$ is particularly preferred. A fluorine-containing compound containing oxygen is not preferred.

To coat the silicon carbide or carbon film, a film-forming method by a gas phase reaction such as plasma CVD coating, chemical CVD coating and the like is preferred since a highly pure and dense film can be formed.

Now, the experiments and concepts on which the present invention is based will be explained. Needless to say, the below explained concepts could be established on the findings from the effective experiments by the present inventors and were not easily assumed.

Analysis of heat resistance

Experiment 1

A quartz glass made muffle tube having an inner diameter of 100 mm, a length of 300 mm and a wall thickness of 2 mm was heated to 1,500° C. and kept at the same temperature one day. The muffle tube was expanded to a length of 400 mm.

Experiment 2

A silicon carbide made muffle tube having the same sizes as the muffle tube used in Experiment 1 but having a dense carbon layer of 0.5 μm in thickness on an inner surface was subjected to the same test as in Experiment 1 to find that no expansion of the muffle tube was observed.

Experiment 3

The same muffle tube as used in Experiment 1 was heated from room temperature to 1,500° C over 3 hours in one day and cooled from 1,500° C. to room temperature in next one day. After repeating heating and cooling for 20 days, the muffle tube was broken due to devitrification.

Experiment 4

The same muffle tube as used in Experiment 2 was subjected to the same heating test as in Experiment 3. After 20 days, no problem arose.

Experiment 5

The same heating test as in Experiment 1 was carried out on a carbon made muffle tube having an inner diameter of 110 mm, a length of 300 mm and a wall thickness of 6 mm and a silicon carbide layer of 200 μm in thickness on the outer wall. No expansion of the muffle tube was observed.

Analysis of oxidation resistance

Experiment 6

A carbon made muffle tube having an inner diameter of 100 mm, a length of 300 mm and a wall thickness of 5 mm and a silicon carbide layer of 200 μm in thickness on the outer wall was used and its interior space was filled with a helium atmosphere and its outer wall was exposed to the air. After keeping the muffle tube at 1,500° C. for 3 hours, no oxidation was observed.

Experiment 7

The same oxidation test as in Experiment 6 was repeated with changing the thickness of the silicon carbide layer to about 5 μm. Some parts of the outer wall were oxidized.

Analysis of corrosion resistance

Experiment 8

The same heating test as in Experiment 6 was repeated with filling the inner space of the muffle tube with an atmosphere of helium containing 10% by mole of Cl₂ and 10% by mole of SF₆. No corrosion of the outer and inner walls of the muffle tube was observed. In addition, no leakage of the Cl₂ and SF₆ gasses through the tube wall was observed. This is because the dense silicon carbide layer prevented the leakage of the gasses.

Experiment 9

The same test as in Experiment 8 was repeated with using a carbon muffle tube having no silicon carbide layer. The outer wall was severely oxidized and the leakage of Cl₂ and SF₄ gasses through the tube wall was observed.

Experiment 10

The same test as in Experiment 8 was repeated with using a muffle tube having a silicon carbide layer on the inner wall instead of the outer wall. The silicon carbide layer on the inner wall reacted with the gasses to dissipate, and the outer wall was oxidized.

Experiment 11

The same corrosion test as in Experiment 8 was repeated with using a silicon carbide made muffle tube having an inner diameter of 100 mm, a length of 300 mm and a wall thickness of 5 mm and a carbon layer of about 1 $\mu$m in thickness. The same results were achieved.

From the results of Experiments 1 to 11, followings can be concluded:

(1) The carbon made muffle tube and the silicon carbide made muffle tube can be resistant to very high temperature in comparison with the pure quartz glass made tube.

(2) When the fluorine-containing gas is used, the silicon carbide made muffle tube having the carbon layer on the inner wall is not etched. The carbon made muffle tube having the silicon carbide layer on the outer wall has the same effect.

Based on the above experiments, it has been found that, as a muffle tube for heating the porous preform at a temperature not lower than 1,500° C., a heat resistant muffle tube having a carbon inner layer is suitable, particularly when the fluorine-containing gas is used. Such findings can be explained as follows.

The muffle tube made of the quartz glass (SiO₂) is etched by a reaction of SiO₂ of the muffle tube or the porous preform with SF₆ according to the following reaction formula (I):

$$SiO_2(s) + SF_6(g) \rightarrow SiF_4(g) + SF_2(g) + O_2(g) \quad (I)$$

wherein (s) and (g) stand for a solid and a gas.

On the other hand, since the carbon does not react with SF₆, SF₆ does not etch the carbon.

In case of the muffle tube made of silicon carbide, the thickness of the carbon layer formed on the inner wall is about 0.01 to 500 $\mu$m to achieve the objects of the present invention. There is no limitation on a method for forming the carbon layer on the inner wall, and any of the conventional methods can be used. For example, a method comprising heating a muffle tube to be coated to a temperature of 1,200 to 1,500° C. and flowing a mixture of argon and a vapor of CH₄ or CCl₄ through the inner space of the muffle tube to deposit the carbon on the inner wall of the muffle tube (the CVD method) is known. In this method, a thickness of the deposited carbon per run is preferably about 0.2 $\mu$m to prevent surface cracking or peeling off. Therefore, the deposition procedure is repeated 500 times to form the carbon layer of 100 $\mu$m.

A thickness of the silicon carbide layer is generally from 10 to 300 $\mu$m, preferably from 50 to 250 $\mu$m.

Figure 4:
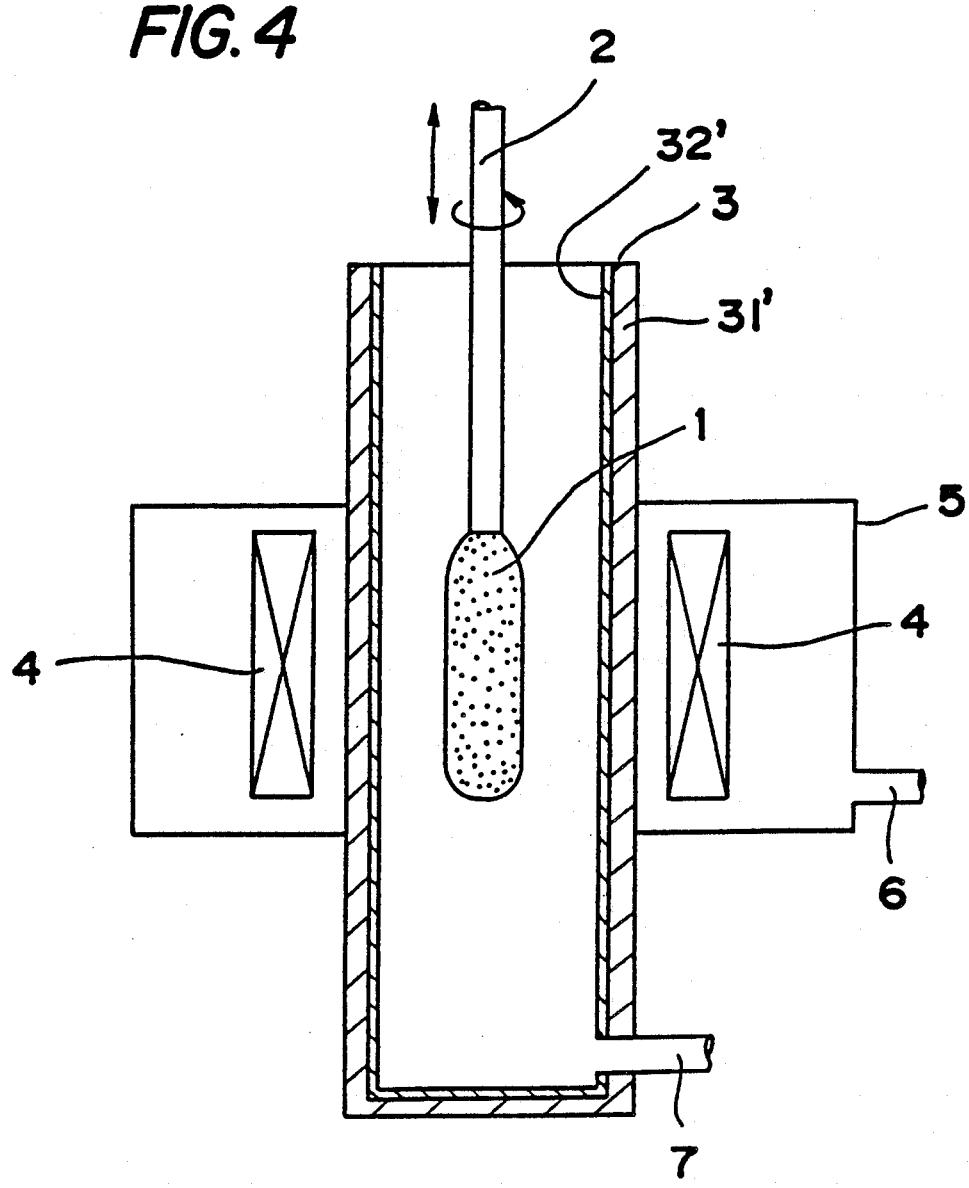

Each of FIGS. 3 and 4 illustrates the above describe first embodiment of the heating furnace of the present invention.

FIG. 3 schematically shows a cross section of one example of the first embodiment of the heating furnace for the optical fiber preform according to the present invention. In FIG. 3, numeral 1 stands for a porous preform, 2 stands for a supporting rod, 3 stands for a muffle tube, 4 stands for a heater, 5 stands for a furnace body, 6 stands for an inlet for introducing an inert gas, and 7 stands for an inlet for introducing an atmosphere gas (e.g. SF₆ and helium). 31 stands for a body of a carbon made muffle tube and 32 stands for a silicon carbide coating layer.

FIG. 4 schematically shows a cross section of another example of the first embodiment of the heating furnace according to the present invention. In FIG. 4, numeral 1 stands for a soot preform, 2 stands for a supporting rod, 3 stands for a muffle tube, 4 stands for a heater, 5 stands for a furnace body, 6 stands for an inlet for introducing an inert gas, and 7 stands for an inlet for introducing an atmosphere gas (e.g. SF₆ and helium). 31' stands for a body of a silicon carbide made muffle tube and 32' stands for a carbon coating layer.

The second embodiment of the present invention will be illustrated by making reference to an example shown in the figure.

Figure 5:
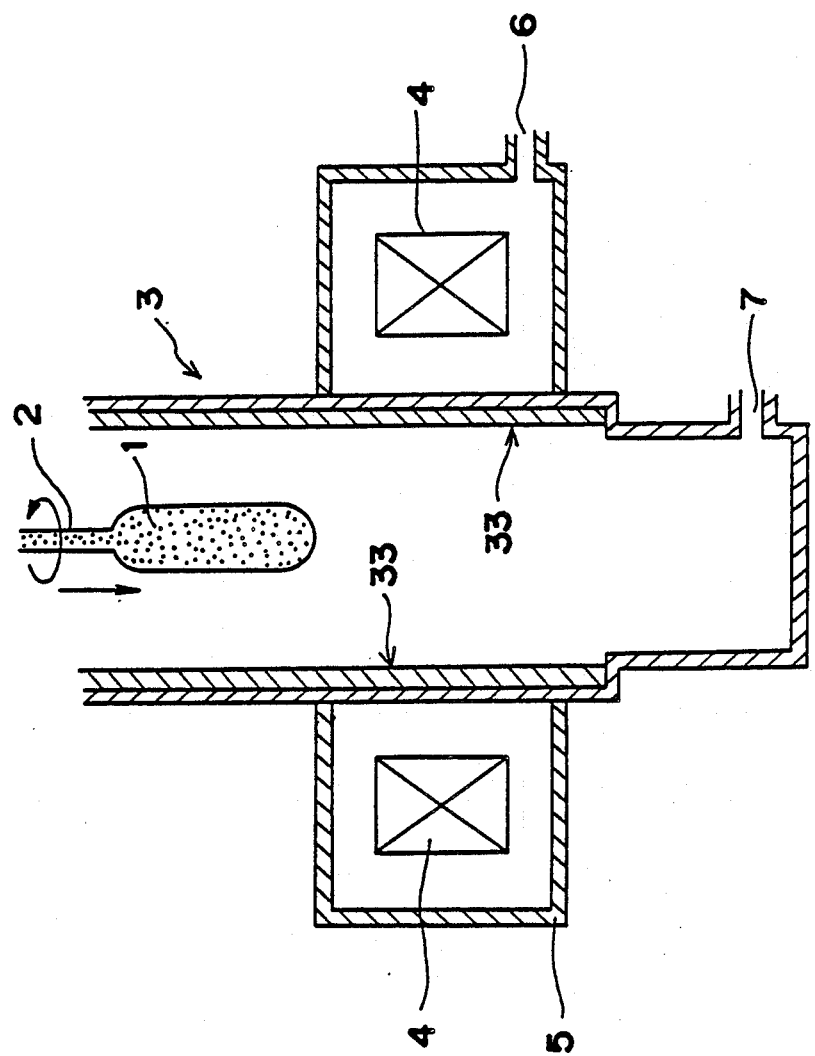

A schematic cross sectional view of this heating furnace is shown in FIG. 5. A heater 4 is installed inside a body of a furnace 5, and a muffle tube 3 is installed at the center of the furnace.

A body of the muffle tube 3 consists of a quartz glass tube having a coating of a carbon layer 33 on an inner wall thereof.

The carbon layer is coated by the same methods as in the above first embodiment.

A thickness of the carbon layer 33 is preferably from 0.01 to 500 $\mu$m. When the thickness of the carbon layer is larger than 500 $\mu$m, the layer tends to peel off, and when it is less than 0.01 $\mu$m, the effect of the carbon layer is not achieved.

Instead of the carbon layer, a ceramic film which has a higher melting point and is corrosion resistant to the fluorine-containing gas can be formed on an undercoat of silicon nitride having a thickness of 2 to 10 $\mu$m. The following compounds are suitable as the ceramics:

Carbides: SiC, WC, TaC
Nitrides: AlN, ThN, ZrN, BN, TaN
Oxides: Al₂O₃, CaO, ZrO₂, ThO₂
Borides: SiB, TaB₂, ZrB At a side end of the furnace body 5, an inlet 6 for supplying a blanketing gas (e.g. argon and nitrogen) is provided. At a lower end of the muffle tube 3, an inlet 7 for supplying a treating gas (e.g. helium, argon, chlorine, the fluorine-containing compound, etc.) is provided. In the upper part of the muffle tube 3, the porous preform 1 is suspended by means of the supporting rod 2.

In the above construction, a quartz glass made muffle tube having an inner lining of carbon layer 33 is more dense and has a smaller coefficient of thermal expansion than the aluminum or carbon made tube so that it is hardly broken by thermal history and has good durability.

To prevent the contamination of the preform due to diffusion of the impurities contained in the quartz glass, it is preferred to make the muffle tube body from the quartz glass as pure and transparent as possible. Preferably, the purity of quartz glass is 0.5 ppm or less of copper in terms of a CuO content and 1 ppm or less of iron in terms of a $Fe_2O_3$ content. Particularly suitable is a transparent quartz glass containing no copper components.

Since the impurities such as copper, iron and water, which are diffused from the outer heater body 5 and the heater 4 cannot penetrate through the carbon layer 33, they are shielded by the carbon layer 33 and cannot migrate into the inside of the muffle tube 3. Therefore, the contamination of the optical fiber preform with the impurities is surely prevented.

Further, since the inner wall of the quartz glass tube is lined by the carbon layer 33, corrosion of the muffle tube is prevented even when the porous preform is sintered in the atmosphere comprising the fluorine-containing compound. Now, etching effect of a HF solution on the quartz glass and the carbon are shown in below Table.

TABLE

|  | Quartz glass | Carbon |
|---|---|---|
| Etched amount ($g/cm^3 \cdot day$) | −0.1 | 0 |

Note:
After immersing a sample in a 46% HF solution at room temperature for 7 days, change of sample weight was measured.

As is clear from the above table, the carbon has notable corrosion resistance. Therefore, copper, iron and water contained in the quartz glass are not exposed on the surface and do not contaminate the preform, so that the purity of the glass preform is further improved.

In the third embodiment of the present invention, the muffle tube consists of an upper, middle and lower parts which are detachably connected, and at least the middle part is made of highly pure carbon and the upper and lower parts are made of a heat and corrosion resistant material.

Now, the third embodiment of the present invention will be illustrated by making reference to the figure.

Figure 6:
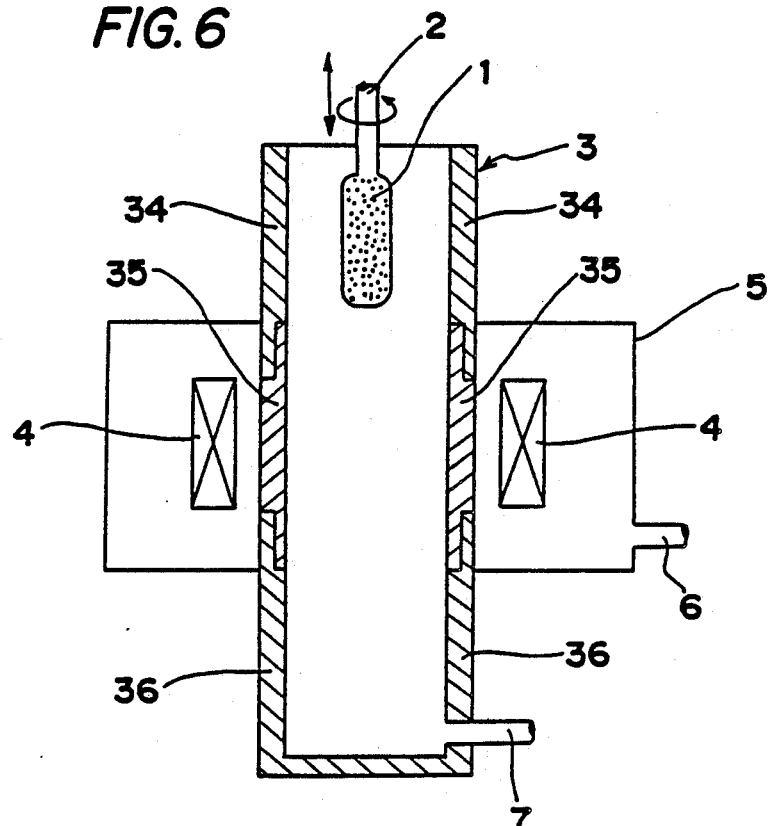

FIG. 6 schematically shows a cross section of this embodiment of the heating furnace. A heater 4 is installed inside a body of a furnace, and a muffle tube 3 is installed at the center of the furnace.

The muffle tube 3 consists of an upper part 34, a middle part 35 and a lower part 36, and the adjacent parts are detachably connected by suitable means such as screwing. The middle part 35 of the muffle tube is made of the highly pure carbon. The purity of the carbon is the same as in the first embodiment.

Since the upper and lower parts are not heated to so high temperature as the middle part, they are not necessarily made by a material so highly pure as the middle part insofar as said material is heat and corrosion resistant. The upper and lower parts are preferably made of a conventional carbon in view of economy. Since the upper and lower parts are heated to a temperature not higher than 1,000° C., they may be made of a quartz material which is less corrosion resistant to the fluorine-containing gas. However, in such case, the contents of iron and copper, particularly copper should be taken care of and are preferably less than 0.1 ppm.

The muffle tube the middle part of which is made of the highly pure carbon is preferable since it does not react with the halogen-containing compound unless the atmosphere contains oxygen, and has excellent heat resistance.

During the treatment of the porous preform, the carbon of the middle part 35 is exposed to high temperature and worn by moisture occluded in the preform and moisture and oxygen migrated from outside after long time use. The carbon inner wall tends to wear due to special causes associated with the treatment of the porous preform which will be explained below.

That is, $SiO_2$ powder liberated from the porous preform adheres to the carbon inner wall and reacts with the carbon to form SiC, and oxygen generated by said reaction further reacts with the carbon to form CO. Formed SiC readily reacts with the chlorine-containing gas which is used for dehydration. The carbon inner wall is worn by such reaction with the $SiO_2$ powder.

These reactions can be expressed by following formulae:

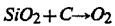
$SiO_2 + C \rightarrow O_2$

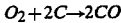
$O_2 + 2C \rightarrow 2CO$

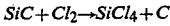
$SiC + Cl_2 \rightarrow SiCl_4 + C$

Therefore, the middle carbon part should be replaced with a new one after prolonged use.

On the contrary, since the upper and lower parts of the muffle tube are not so severely worn, only the middle part can be preferably replaced when the muffle tube consists of three parts.

Since the carbon is porous, it is necessary to thoroughly remove absorbed moisture at high temperature. Therefore, in view of the removal of absorbed moisture, it is preferred to replace the carbon muffle tube as less frequently as possible. When the middle part of the muffle tube of the invention is worn out, it is not necessary to remove the absorbed moisture from the upper and lower parts since they can still continuously used. Apart from the economy, the three part muffle tube of the present invention has various advantages.

As describe above, the upper part 34 and the lower part 36 may be made of the quartz glass instead of a porous material such as carbon. Particularly, highly pure quartz containing no impurities such as copper and iron is preferred. Copper and the like tend to generate oxide vapors of CuO and the like at a temperature higher than 600° C. and contaminate the porous preform.

At the side end of the furnace body 5, an inlet 6 for supplying a blanketing gas (e.g. argon, helium and nitrogen) is provided, and at the lower end of the muffle tube 3, an inlet 7 for supplying a treating gas (e.g. helium, argon, the chlorine-containing gas and the fluorine-containing gas) is provided. In the upper part of the muffle tube 3, the porous preform 1 is suspended by means of the supporting rod 2.

Figure 7:
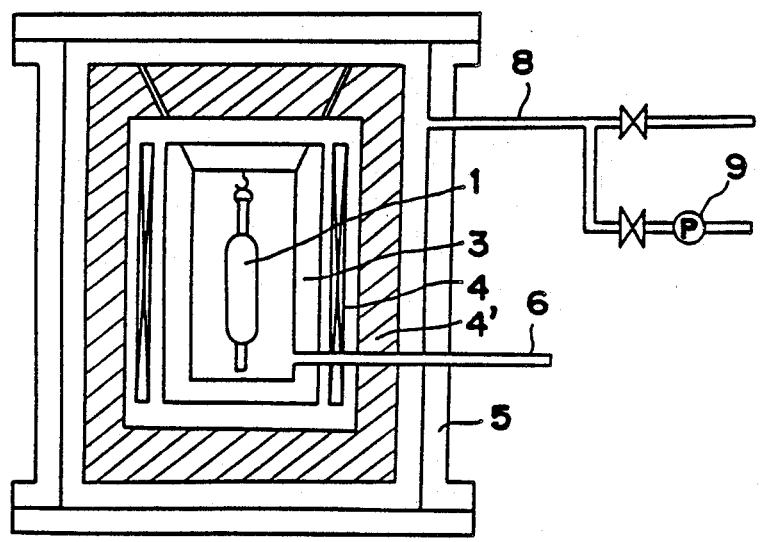

Generally, the heating furnace is constructed as illustrated in FIGS. 3 to 6 which have been explained or as illustrated in FIG. 7 which will be hereinbelow explained.

FIG. 7 shows an example of the heating furnace for carrying out thermal treatment under elevated or reduced pressure. The furnace body 5 consists of a pressure vessel. The heating furnace of this embodiment comprises a carbon heater 4, a muffle tube 3, an insulator 4', an inlet 6 for supplying a gas constituting a muffle tube atmosphere, an outlet of the gas for the muffle tube atmosphere and a pump 9.

Since the heating furnace can be designed as shown in FIG. 6 or FIG. 7, the air (environmental atmosphere) flows into the muffle tube interior space when the preform is inserted into or removed from the muffle tube.

Figure 8:
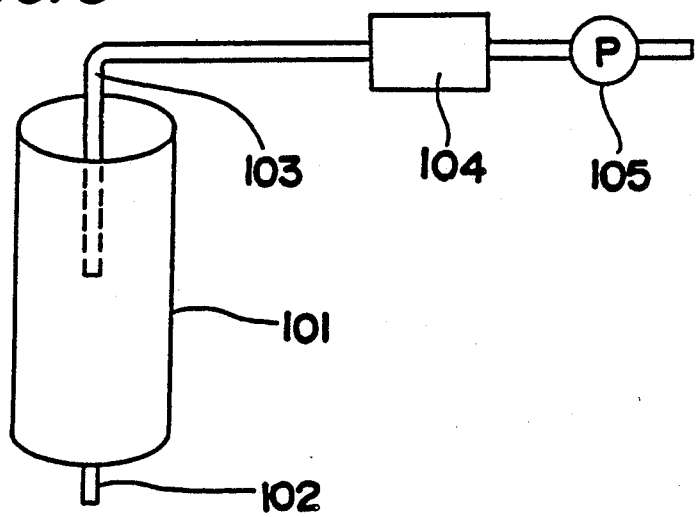
Figure 9:
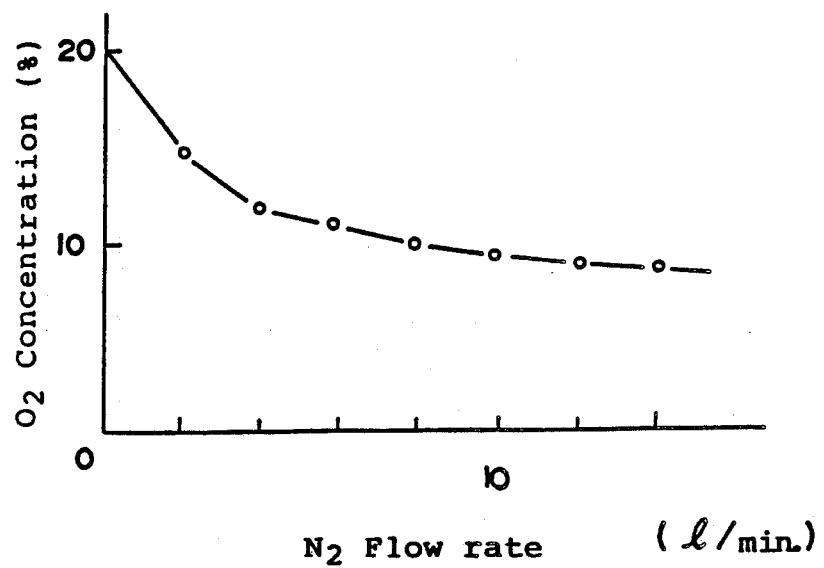
FIG. 9 is a graph showing the amount of inflow air, FIGS. 10 and 11 schematically show cross sections of the fourth embodiment of the heating furnace for the preform of the optical fiber according to the present invention.

FIG. 8 schematically shows an equipment which is used in measurement of an amount of the air inflow into the muffle tube. This equipment comprises a muffle tube 101, an inlet for purging gas 102, a gas sampling tube 103, a device for measuring an oxygen concentration 104 and a pump 105. An inner diameter of the muffle tube 101 is 150 mm, and the front end of the gas sampling tube 103 is fixed at a point which is 1 m below from the upper edge of the muffle tube. The results are shown in FIG. 9. These results suggest that the air flows into the muffle tube, and such air inflow cannot be prevented by increase of the purging nitrogen gas.

Figure 15:
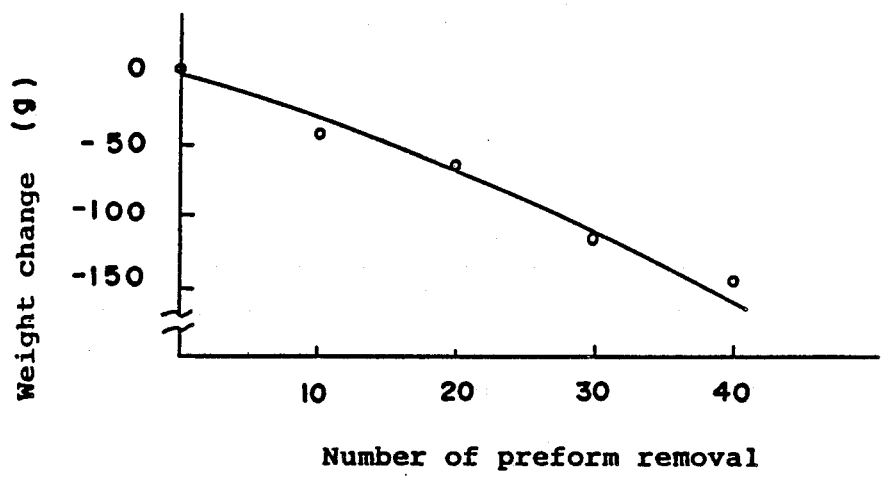
FIG. 15 is a graph showing weight loss of the carbon muffle tube.

Inflow of the air will cause various problems. Firstly, the interior space of the muffle tube is contaminated by dust in the air. The dusts comprise $SiO_2$, $Al_2O_3$, $Fe_2O_3$ and the like. Among them, $Al_2O_3$ will cause devitrification of the preform, and $Fe_2O_3$ will cause increase of transmission loss of the optical fiber. Secondly, the inner surface of the carbon made muffle tube is oxidized. During oxidation of the sintered body of carbon, it is known that tar or pitch which is used as a binder is firstly oxidized. Therefore, the remaining graphite particles are dropped or splashed and float in the furnace. Since said particles adhere to the surface of the sintered glass preform, the optical fiber fabricated from such glass preform has many parts with low strength. As a natural consequence, the lifetime of the carbon made muffle tube is extremely shortened. FIG. 15 shows results of measured weight loss of the carbon made muffle tube. After repeating the removal of the glass preforms 40 times, the surface of 0.4 mm in thickness of the carbon made muffle tube was oxidized and worn. The lifetime of the carbon muffle tube having a wall thickness of 1 cm is estimated to be about 2.5 months.

One of the measures to prevent such oxidation of the muffle tube is to reduce the temperature to 400° C. or lower at which the carbon is not oxidized during the insertion and removal of the glass preform. However, at such low temperature, an operation rate of the furnace is greatly decreased. The contamination of the interior space of the muffle tube with the dusts in the air cannot be prevented. The inflow of the air into the muffle tube can be prevented by the forth embodiment of the heating furnace according to the present invention. In addition to the heater and the muffle tube, the heating furnace of the fourth embodiment comprises as front chamber through which the porous preform is inserted into and removed from the muffle tube.

Preferably, the front chamber can be heated up to 800° C. and evacuated to a pressure down of $10^{-2}$ Torr. or less.

The front chamber is preferably made of a heat resistant material which liberates no impurities, such as quartz glass, SiC, $Si_3N_4$, BN and the like. The front chamber may be made of the same material as or different from that of the muffle tube.

The front chamber may be evacuated by a rotary pump. To prevent a back flow of a pump oil, a liquid nitrogen-cooled trap may be connected between the pump and the front chamber. At the upper wall of the front chamber, a rotary installing mechanism having a magnetic seal is provided.

This embodiment is particularly useful when the muffle tube is made of the highly pure carbon, although it can be used for the muffle tube made of other materials such as the quartz glass.

The fourth embodiment of the heating furnace will be explained by making reference to the accompanying figures.

FIG. 10 schematically shows a cross sectional view of one example of the fourth embodiment of the heating furnace. This heating furnace is the same as that of FIG. 6 to which the front chamber 11 is attached. Namely, in addition to all the parts of the heating furnace of FIG. 6, this heating furnace comprises the front chamber 11, an outlet 14 for front chamber gas, an inlet 15 of a gas for purging the gas in the front chamber and a partition 16.

FIG. 11 shows an example of the fourth embodiment of the heating furnace for carrying out thermal treatment under elevated or reduced pressure. This heating furnace is the same as that of FIG. 7 to which the front chamber 11 is attached. Namely, in addition to all the parts of the heating furnace of FIG. 7, this heating furnace comprises the front chamber 11, a heater 12, a pump 13, the outlet 14 for front chamber gas, an inlet 15 of a gas for purging the gas in the front chamber and a partition 16.

The insertion of the porous preform into the heating furnace of FIG. 10 is carried out as follows:

1. To a rotatable vertically movable chuck, the porous preform 1 is attached through the supporting rod 2.

2. An upper cover of the front chamber 11 is opened, and the porous preform 1 is lowered into the front chamber 11.

3. The upper cover is closed, and the interior space of the front chamber is purged with an inert gas (e.g. nitrogen or helium).

4. The partition 16 which separates the front chamber 11 and the heating atmosphere is opened, and the porous preform 1 is introduced in the heating atmosphere which has been kept at a temperature at which the preform is thermally treated.

5. The partition 16 is closed.

The preform is removed from the heating furnace of the present invention as follows:

1. The partition 16 is opened.

2. The preform 1 which has been thermally treated is pulled up from the heating atmosphere to the front chamber 11. In this step, the temperature of the heating atmosphere is not necessarily lowered.

3. The partition 6 is closed.

4. The upper cover of the front chamber 11 is opened, and the preform is removed from the chamber 11.

According to another aspect of the present invention, there is provided a method for producing a glass preform for an optical fiber which comprises thermally treating a porous preform comprising fine particles of quartz glass in a heating furnace comprising a muffle tube at least an inner layer of which is made of carbon in an inert gas atmosphere containing, as an agent for adding fluorine to the glass, at least one fluoride selected from the group consisting of silicon fluorides and carbon fluorides so as to add fluorine to the glass, and simultaneously or thereafter, vitrifying the fine particles of the glass to give a glass preform.

As the muffle tube, one of the above described muffle tubes of various embodiments of the present invention is used.

To completely remove the contaminations during processing of the muffle tube or absorbed dust and moisture, the carbon made muffle tube is preferably baked for several hours in an atmosphere comprising the chlorine-containing gas, particularly $Cl_2$ at a temperature not lower than 1,500° C. When the optical fiber is fabricated from the glass preform which is produced by means of an unbaked muffle tube, it may have considerable absorption due to the moisture or the impurities.

Further, to prevent the penetration of the impurities from outside, the outer wall of the muffle tube is preferably covered with a heat resistant material. As the covering material, ceramics or metals which have a nitrogen permeability of the order of $10^{-6} cm^2/sec$ or less are preferred. As the ceramics, in addition to the above exemplified silicon carbide, $Al_2O_3$, BN and the like are used. Particularly, $\beta$-SiC which is formed by the CVD method is preferred. Since silicon carbide has good affinity with the carbon and no pin holes or microcracks, it can maintain high denseness. This is because the coefficient of thermal expansion of silicon carbide is close to that of the carbon. Further, silicon carbide has excellent heat resistance and moisture resistance. $Al_2O_3$ is less preferred than other ceramics, since it may generate AlC at high temperatures.

As the metals, those which do not react with the carbon such as platinum and tantalum are preferably used. The metal is coated on the carbon surface by flame spray coating. When a metal which is highly reactive with the carbon such as titanium and nickel is used, the carbon surface is precoated with ceramics and then such metal is flame spray coated.

The larger thickness of the outer wall coating is better. However, too thick coating may suffer from peeling off due to thermal history. Therefore, the thickness of the outer wall coating is generally from 10 to 300 $\mu$m, preferably from 50 to 250 $\mu$m, although it may vary with the kind of the material.

Among the fluorine-dopant to be used in the method of the present invention, $SiF_4$ is most preferred. $SiF_4$ is preferably a highly pure product of 3N or higher.

Although $SiF_4$ does not react with the carbon at all, when the soot preform is used without thorough dehydration, it may generate fume in the carbon made muffle tube in the step of addition of fluorine. Such fume can be generated by the reaction of the moisture in the soot preform with $SiF_4$ or the carbon. As the result, deposits which may be carbon particles are accumulated on the upper portion of the soot preform. To prevent this, preferably, the soot preform is dehydrated before thermally treating it in the muffle tube having the atmosphere containing $SiF_4$. The dehydration of the soot preform is carried out at a temperature at which the soot preform does not shrink in an atmosphere of an inert gas (e.g. argon or helium) containing not larger than 10% by mole of a chlorine-containing gas having no oxygen such as $Cl_2$, $CCl_4$ and $S_2Cl_2$, particularly $Cl_2$ and $CCl_4$. The dehydration temperature is usually from 800 to 1,200° C.

Although it is possible to dehydrate the soot preform simultaneously with the addition of fluorine, the dehydration is carried out before the addition of fluorine because of the reasons described above and dehydration effect.

The addition of fluorine to the soot preform with $SiF_4$ is effectively performed at a temperature of 1,000° C. or higher, preferably from 1,100 to 1,400° C. A sufficient amount of fluorine should be added to the preform before the shrinkage of the soot preform is completed. If the soot preform shrinks before the sufficient amount of fluorine is added, fluorine is not added to the entire preform and is ununiformly added so that distribution of the amount of added fluorine is formed in the preform.

The soot preform is generally produced by the flame hydrolysis method and consists of fine particles of glass having a particle size of 0.1 to 0.2 $\mu$m.

The present invention will be explained further in detail.

Production of soot preform

To produce a mass of fine particles of quartz glass by flame hydrolysis, by using a quartz glass made coaxial multi tube burner 41 as shown in FIG. 12A, oxygen 42, hydrogen 43 and, as a raw material gas, $SiCl_4$ or a mixture of $SiCl_4$ and a doping compound (e.g. $GeCl_4$) are supplied to the center of the oxyhydrogen flame from an inlet 45 together with a carrier gas to react them.

An inert gas for shielding is supplied from an inlet 44 so that the raw material gas reacts in a space several millimeters apart from the front end of the burner 41. To produce a rod form soot preform, the particles of the glass are deposited on the lower tip of a rotating seed rod 46 in a direction of the axis of the seed rod 46. To produce a pipe form soot preform, the particles of the glass are deposited around a periphery of a rotating quartz or carbon rod 46 with traversing the burner 47, and then the rod 46 is removed. The rod 46 can be a glass rod for the core. In such case, it is not necessary to remove the rod. Plural number of burners 47 may be used.

Figure 13A:
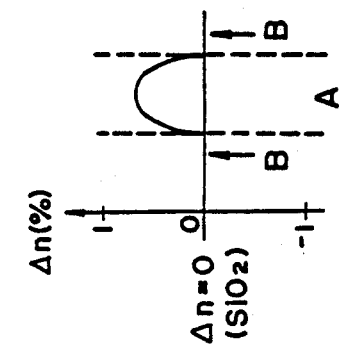
FIGS. 13A to 13C show the structures of the soot preforms produced in Examples 9 to 11 or Examples 13 to 15, respectively.
Figure 13B:
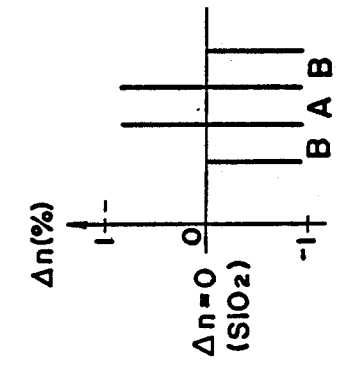
Figure 13C:
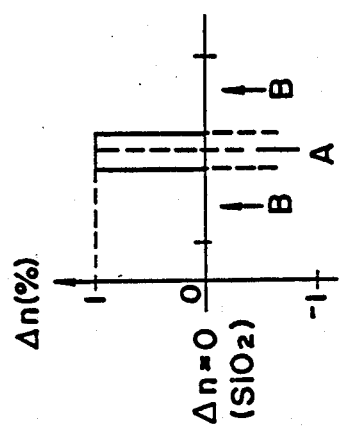

The soot preforms produced as above have refractive index structures as shown in FIGS. 13A, 13B and 13C, in which "A" and "B" correspond to the core part and the cladding part, respectively.

Fluorine addition to soot preform and vitrification (sintering) of preform

Figure 14A:
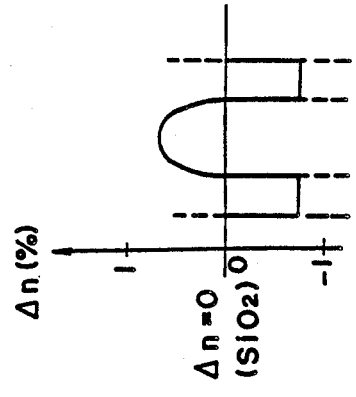
FIGS. 14A to 14C show the structures of the glass preforms which were produced by adding fluorine to the soot preforms produced in Examples 9 to 11 or Examples 13 to 15, respectively.
Figure 14B:
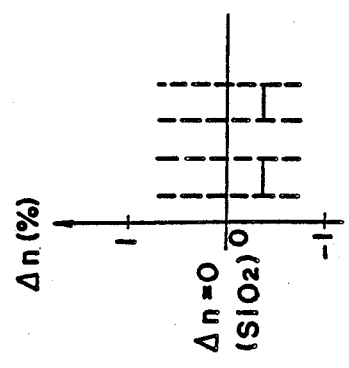
Figure 14C:
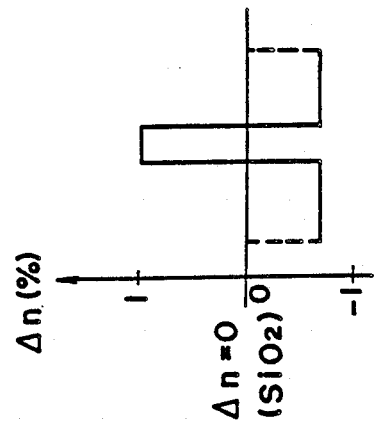

In the muffle tube (cylindrical muffle tube with upper and lower flanges) made of highly pure carbon the outer peripheral surface of which is coated with a material having small gas permeability, for example, as shown in FIG. 6, the soot preform produced in the above step is suspended at a position above the heater, and the interior of the muffle tube is filled with an atmosphere of helium containing $Cl_2$ gas. After heating the atmosphere to 1,050° C. by the heater, the soot preform is lowered at a rate of 2 to 10 mm/min. After the whole soot preform passes the heater, the lowering of the soot preform is stopped and the supply of the $Cl_2$ gas is terminated. Then, the atmosphere is changed to a helium atmosphere containing $SiF_4$. After the heater temperature reaches 1,650° C., the soot preform is pulled up at a rate of 4 mm/min. so as to add fluorine to the preform and simultaneously to make the preform transparent. In the refractive index structure of the glass preform, since fluorine is added, the refractive indexes of the core and cladding parts are decreased as shown in FIGS. 14A, 14B and 14C.

The present invention will be illustrated by following Examples.

EXAMPLE 1

The quartz made muffle tube having a carbon inner lining of 0.5 μm was heated to 1,600° C. by the heater, and $SF_6$ and helium were flowed therein at rates of 50 ml/min. and 5 l/min., respectively. Then, a porous preform was inserted in the muffle tube at a lowering rate of 2 mm/min. The obtained transparent glass preform was drawn to fabricate an optical fiber. The optical fiber contained 0.01 ppm of residual water, and had no absorption due to copper or iron.

By using the same muffle tube, 100 transparent glass preforms were produced No deterioration of the muffle tube body or the carbon coating was observed.

COMPARATIVE EXAMPLE 1

In the same manner as in Example 1 but using a quartz glass made muffle tube containing 1 ppm of copper but having no carbon inner lining, an optical fiber was fabricated. The optical fiber contained 0.01 ppm of residual water, and had absorption due to copper near to a wavelength of 1.30 μm. This was sufficiently low in comparison with absorption by the conventional optical fiber and the absorption value was 2 to 3 dB/km at a wavelength of 0.8 μm. However, the inner wall of the muffle tube was severely etched. This means that this muffle tube had insufficient corrosion resistance.

EXAMPLE 2

By using the same muffle tube as used in Example 1 and filling the interior of the muffle tube with 100% $SiF_4$ atmosphere, the porous preform was doped with fluorine and vitrified simultaneously in the muffle tube. The transparent glass preform contained fluorine in an amount corresponding to $\Delta^-$ of 0.7%. The produced glass preform was bored along its axis to form a cladding member. By using such cladding member, a single mode optical fiber was fabricated. The optical fiber had no absorption due to impurities, and transmission loss at a wavelength band of 1.5 μm was as low as 0.25 dB/km.

EXAMPLE 3

The heating furnace of FIG. 10 was used. The porous preform was inserted in the front chamber and the upper cover was closed. The nitrogen gas was supplied at a rate of 10 l/min. for 10 minutes to replace the interior gas in the front chamber with nitrogen. Then, the partition was opened, and the porous preform was inserted in the muffle tube from the front chamber. After closing the partition, the preform was thermally treated to produce a transparent glass preform. To remove the preform from the heating furnace, the partition was opened, the preform was moved to the front chamber, the partition was closed, and then the upper cover was opened followed by removal of the preform.

An optical fiber fabricated from this glass preform had low transmission loss of 0.18 dB/km at a wavelength of 1.55 μm.

EXAMPLE 4

In the same manner as in Example 3, 40 transparent glass preforms were produced. The weight loss of the carbon made muffle tube was 20 g, which corresponds to oxidation wear of 50 μm from the surface. This worn amount suggests that the carbon muffle tube could be used for about 1.5 years.

EXAMPLE 5

Figure 16:
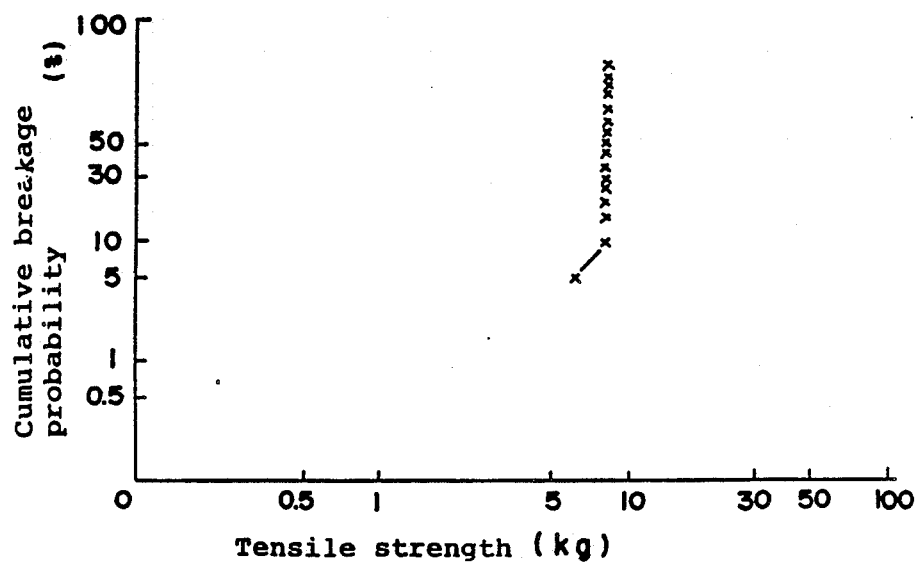
FIG. 16 is a graph showing results to tensile test of the optical fiber.

The apparatus of FIG. 11 was used. A porous preform was inserted in the front chamber, the upper cover was closed, and the nitrogen gas was supplied at a rate of 10 l/min for 10 minutes to the front chamber to replace the interior of the front chamber with the nitrogen gas. Then, the partition was opened, the porous preform was moved into the muffle tube which was kept at 1,000° C. and then the partition was closed. Thereafter, the furnace was evacuated to $10^{-2}$ Torr. and heated to 1,600° C. to vitrify the porous preform so as to produce a glass preform. The produced glass preform was used as a jacketing member and therefrom an optical fiber was fabricated and subjected to tensile test. The results (Weibull plot) is shown in FIG. 16. The low strength parts were only 5%.

EXAMPLE 6

The apparatus of FIG. 11 was used. A porous preform was inserted in the front chamber, and the interior of the front chamber was replaced with nitrogen. Then, the partition was opened, the porous preform was moved into the muffle tube which was kept at 1,000° C. and the partition was closed. Thereafter, the furnace was pressurized to 2 kg/cm² with introducing $SiF_4$, and the porous preform was vitrified under such conditions to produce a transparent glass preform. The produced glass preform contained 3% by weigh of fluorine. By using this glass preform as a cladding material, a single mode optical fiber was fabricated. It had transmission loss of 0.22 dB/km at a wavelength of 1.55 μm, and its low strength parts according to the tensile test were 5%.

EXAMPLE 7

The apparatus of FIG. 11 was used. After the porous preform was inserted in the front chamber, the front chamber was kept under pressure of $10^{-2}$ Torr. at 800° C. for 1 hr. Then, the partition was opened, the porous preform was moved into the muffle tube and the partition was closed. Thereafter, the preform was subjected to the thermal treatment to produce a transparent glass preform. An optical fiber fabricated from the produced preform which was used as a core material had very low transmission loss of 17 dB/km at a wavelength of 1.55 μm.

EXAMPLE 8

In the same manner as in Example 7, 40 porous preforms were thermally treated. The weight loss of the carbon made muffle tube was 15 g, which corresponds to oxidation wear of 40 μm from the surface. This worn amount suggests that the carbon muffle tube could be used for about 2 years.

In subsequent Examples, the muffle tube of FIG. 6 was used. The muffle tube was made of the carbon and had a silicon carbide layer of 150 μm in thickness on the outer wall, and had an inner diameter of 150 mm, an outer diameter of 175 mm and a length of 1,500 mm.

EXAMPLE 9

On a peripheral surface of a starting member consisting of a quartz glass rod containing 17% by weight of $GeO_2$ which constituted the core part, soot of pure quartz ($SiO_2$) was deposited by flame hydrolysis to produce a soot preform having the refractive index profile of FIG. 13A.

The soot preform was suspended at a position about 5 cm above the heater 3 in an atmosphere of helium containing 1% by mole of $Cl_2$. When the heater temperature reached 1,050° C., the soot preform was lowered at a rate of 3 mm/min. After the whole soot preform passed the heater 3, it was pulled up at a rate of 20 mm/min. till the lower end of the preform reached a position about 5 cm above the heater.

Then, the heater temperature was raised to 1,750° C. and the supply of $Cl_2$ was terminated. Instead, helium containing 20% by mole of $SiF_4$ was supplied to the muffle tube, and the soot preform was lowered at a rate of 2 mm/min. to make it transparent.

The produced glass preform had a refractive index profile of FIG. 14A.

The glass preform was drawn to fabricate an optical fiber having an outer diameter of 125 μm by means of a drawing furnace. The content of the OH groups in the optical fiber was 0.01 ppm and its transmission loss at a wavelength of 1.30 μm was as low as 0.45 dB/km. No absorption peak due to impurities such as copper and iron was observed.

EXAMPLE 10

In the same manner as in Example 9 but using a pure quartz rod having a diameter of about 8 mm as a starting member, soot of pure $SiO_2$ was deposited to produce a soot preform having the refractive index profile of FIG. 13B.

In the same manner as in Example 9 but supplying $SiF_4$ in a concentration of 10% by mole, the soot preform was thermally treated (dehydration, fluorine addition and vitrification). The produced glass preform had a refractive index profile of FIG. 14B.

The composition of the part of the preform to which fluorine was added was analyzed by an IR spectrometer to find that the content of the OH groups was less than 0.1 ppm.

EXAMPLE 11

On a peripheral surface of a starting member consisting of a quartz glass rod containing 0 to 17% by weight of $GeO_2$ and having a refractive index profile of FIG. 13C, soot of pure $SiO_2$ was deposited by flame hydrolysis. Then, in the same manner as in Example 9, the soot preform was thermally treated. The produced glass preform had a refractive index profile of FIG. 14C.

COMPARATIVE EXAMPLE 2

Heat resistance of a quartz glass made muffle tube

In the same manner as in Example 9 but using the quartz glass made muffle tube in place of the carbon made muffle tube, a soot preform was produced. The quartz glass made muffle tube was expanded during vitrification of the soot preform and could not be reused.

COMPARATIVE EXAMPLE 3

Etching of a quartz glass made muffle tube

In the procedures of Comparative Example 2, $SF_6$ was used in place of $SiF_4$. Then, the quartz glass made muffle tube was heavily etched to form pin holes in the wall near the heater. The produced glass preform contained several ppm of water. Of course, the muffle tube was considerably expanded and could not be reused.

EXAMPLE 12

Repeated use of the carbon made muffle tube

In the same manner as in Example 10, ten glass preforms were produced. All the produced glass preforms had substantially the same quality.

EXAMPLES 13-15

In the same manner as in each of Examples 9 to 11 but supplying no $Cl_2$ gas, a glass preform was produced.

The soot preforms and the glass preforms had substantially the same refractive index profiles as those produced in Examples 9 to 11, respectively.

Characteristics of an optical fiber fabricated from a glass preform

The characteristics of the optical fibers fabricated from the glass preform produced in Examples 9 to 11 were measured. The optical fibers showed no absorption increase due to impurities was observed and had sufficiently low transmission loss, for example 0.4 dB/km at a wavelength of 1.30 μm. Further, the absorption peak due to the OH groups did not change with time.

On the contrary, the optical fibers fabricated from the glass preforms produced in Examples 13 to 15 contained a comparatively large amount of the OH groups so that the absorption loss at a wavelength of 1.30 μm was slightly larger but still practically acceptable. From this fact, it is understood that it is better to dehydrate the preform in the presence of the chlorine-containing gas for the purpose of decreasing the transmission loss of the optical fiber.

In the method of the present invention, the addition of fluorine and the vitrification of glass may be performed separately from each other by using different heating furnaces or the same heating furnace. In either case, the same amount of fluorine is added and the optical fiber has the same characteristics.

EXAMPLE 16

Figure 17:
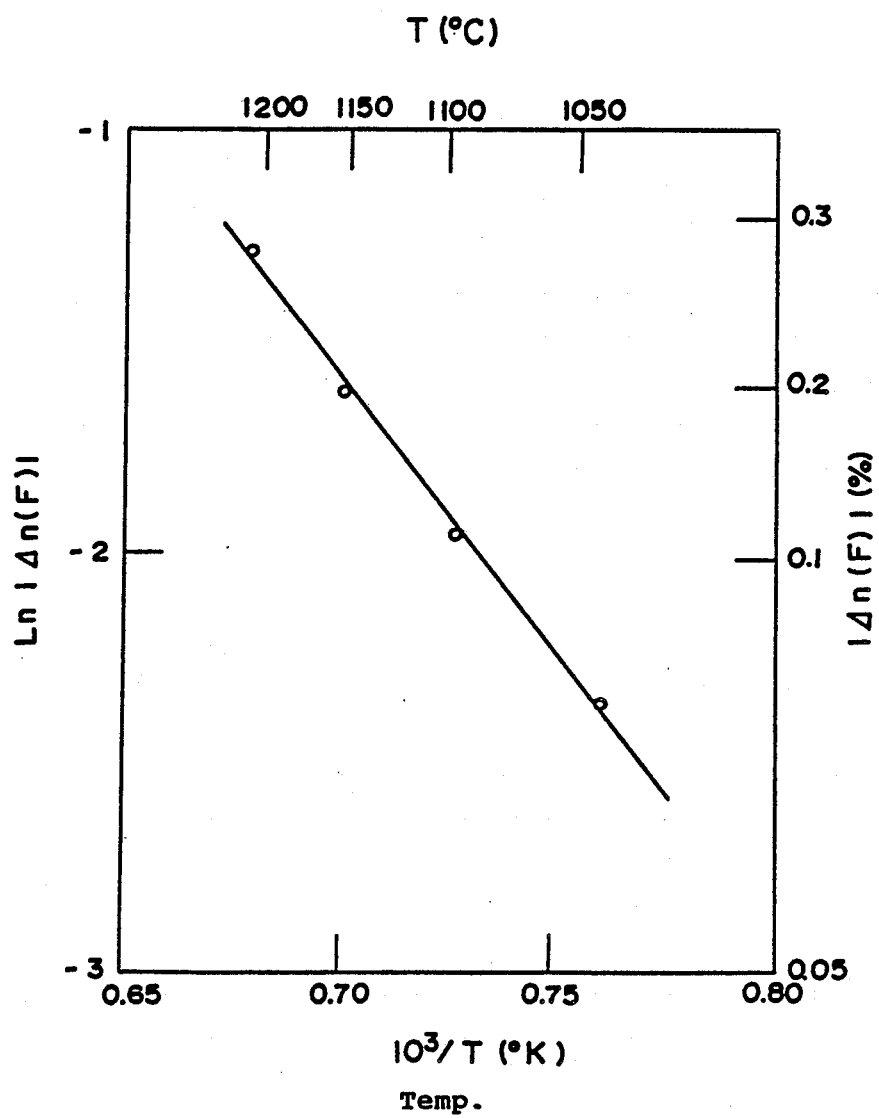
FIG. 17 is a graph showing a relationship between heating temperature and a specific refractive index difference $\Delta n(F)$ of the optical fiber in Example 16.

Treating temperature in an atmosphere comprising the fluorine-containing gas and a relationship between the amount of added fluorine and refractive index difference FIG. 17 shows refractive index differences (Δn−%) achieved by keeping a porous preform at a temperature indicated on the axis of abscissa in an atmosphere of an inert gas containing 1% by mole of chlorine gas and 2% by mole of $SiF_4$ for 3 hours. From these results, it was understood that the fluorine could be effectively added to the soot preform in a temperature range of 1,100° to 1,400° C.

EXAMPLES 17(1) to 17(3)

Three soot preforms which were substantially the same as those of Examples 9 to 11 were produced (in Examples 17(1), 17(2) and 17(3)). Each of them heated and dehydrated in an atmosphere of argon containing 1% by mole of $Cl_2$ in a temperature range of 800° to 1,100° C. and heated from 1,100° C. to 1,400° C. in an atmosphere of helium containing 20% by weight of highly pure $SiF_4$ to make it transparent.

From each of the produced glass preforms, an optical fiber was fabricated and its characteristics were measured. All the optical fibers showed no increase of absorption due to impurities and had sufficiently low absorption loss, for example, less than 0.5 dB/km at a wavelength of 1.30 μm. Further, the absorption peak due to the OH groups did not change with time.

EXAMPLE 18

In the same manner as in Example 9 but using, as the starting member, a glass rod of 10 mm in diameter consisting of a center part of pure quartz and a quartz layer which was formed on the periphery of the center part and contained 1% by weight of fluorine, a soot preform was produced.

The soot preform was inserted from its one end to the other at a rate of 4 mm/min. into a zone heating furnace kept at 1,200° C. having an atmosphere of helium gas containing 2% by mole of $Cl_2$. After the furnace was heated in an atmosphere of helium gas containing 20% by mole of $SiF_4$ at 1,650° C., the soot preform was inserted from one end at a rate of 4 mm/min. into the furnace to make it transparent. From the glass preform, an optical fiber was fabricated.

By the measurement of the characteristics of the fabricated optical fiber, it was found that the fiber showed no absorption due to impurities and had sufficiently low transmission loss, for example, less than 0.4 dB/km at a wavelength of 1.30 μm.

Effects of the present invention

According to the present invention, the glass preform for the optical fiber which is not contaminated with iron or copper is produced with decreasing the wear of the muffle tube, and from the produced glass preform, the optical fiber having small transmission loss can be fabricated.

By forming the inner wall of the muffle tube from the carbon layer and the outer wall from the silicon carbide, the muffle tube is hardly worn by heat or the corrosive gases even at high temperature so that it has good durability. Therefore, the muffle tube of the present invention is also economically advantageous.

By providing the carbon coating onto the inner wall, the corrosive wear of the quartz glass made muffle tube by fluorine is prevented so that the durability of the muffle tube is improved.

Further, by making the middle part of the muffle tube from the highly pure carbon, the contamination of the porous preform with the impurity is prevented, said part does not react with the fluorine-containing gas (e.g. $CF_4$, $SF_6$, $SiF_4$ etc.), and the muffle tube is not broken at an extremely high temperature such as 1,800° C. or higher. Therefore, the durability of the muffle tube is further increased.

When the front chamber is provided to the heating furnace, the inflow of the air (atmosphere of the work room) into the heating atmosphere is prevented, and the contamination of the preform with the impurities contained in the muffle tube material is prevented. Therefore, the devitrification of the preform is prevented and the transparency of the preform is increased. Since the temperature is not decreased during the insertion and removal of the preform, the operation rate of the furnace is high. When the muffle tube is made of the carbon, since the carbon is not oxidized, the life time of the muffle tube is increased, and the graphite particles do not float in the muffle tube so that the ratio of the low strength part in the optical fiber fabricated from the glass preform is decreased. When the front chamber can be heated up to 800° C. and evacuated down to $10^{-2}$ Torr., the impurities (e.g. metals and moisture) adhered to the porous preform are beforehand removed in the front chamber. Therefore, the purity of the glass preform is much increased, and oxygen is not generated by the thermal decomposition of water so that the life time of the carbon made muffle tube is further improved.

What is claimed is:

1. A heating furnace for heating a porous preform made of fine particles of quartz base glass for an optical fiber in an atmosphere comprising a fluorine-containing atmosphere to add fluorine to the preform and to vitrify the preform to produce a glass preform for an optical fiber, which comprises a heater and muffle tube positioned inside the heater to separate an atmosphere heated by the heater from the heater, wherein the muffle tube comprises an inner layer made of highly pure carbon and an outer layer made of silicon carbide.

2. The heating furnace according to claim 1, wherein the muffle tube comprises a tube body made of silicon carbide and a layer of highly pure carbon coated on an inner wall of the tube body.

3. The heating furnace according to claim 1, wherein the muffle tube comprises a tube body made of highly pure carbon and a layer of silicon carbide coated on an outer wall of the tube body.

4. A heating furnace for heating a porous preform made of fine particles of quartz base glass for an optical fiber in an atmosphere comprising a fluorine-containing atmosphere to add fluorine to the preform and to vitrify the preform to produce a glass preform for an optical fiber, which comprises a heater and a muffle tube positioned inside the heater to separate an atmosphere heated by the heater from the heater, wherein the muffle tube comprises a tube body made of quartz glass and a layer of carbon coated on an inner wall of the tube body, the carbon layer being formed by a CVD method or a plasma CVD method and the carbon layer having a thickness of from 0.01 to 500 μm.

5. A heating furnace for heating a porous preform made of fine particles of quartz base glass for an optical fiber in an atmosphere comprising a fluorine-containing atmosphere to add fluorine to the preform and to vitrify the preform to produce a glass preform for an optical fiber, which comprises a heater and a muffle tube positioned inside the heater to separate an atmosphere heated by the heater from the heater, wherein the muffle tube consists of upper, middle and lower parts, the adjacent parts thereof being detachably connected, the middle part being made of highly pure carbon and the upper and lower parts being made of a heat and corrosion resistant material.

6. The heating furnace according to claim 5, wherein purity of the carbon constituting the middle part is such that a total ash content is not larger than 20 ppm.

7. A heating furnace for heating a porous preform made of fine particles of quartz base glass for an optical fiber in an atmosphere comprising a fluorine-containing atmosphere to add fluorine to the preform and to vitrify the preform to produce a glass preform for an optical fiber, which comprises a heater and a muffle tube positioned inside the heater to separate an atmosphere heated by the heater from the heater, wherein at least the inner layer of the muffle tube consists of highly pure carbon, and which further comprises a front chamber in which the porous preform is kept and inserted in or removed from the muffle tube.

8. A method for producing a glass preform for an optical fiber which comprises thermally treating a porous preform comprising fine particles of quartz glass in a heating furnace comprising a muffle tube, at least an inner layer of which is made of carbon and an outer wall of which is coated with silicone carbide, in an inert gas atmosphere containing, as an agent for adding fluorine to the glass, at least one fluoride selected from the group consisting of silicon fluorides and carbon fluorides so as to add fluorine to the glass, and simultaneously or thereafter, vitrifying the fine particles of the glass to give a glass preform.

9. The method according to claim 8, wherein the heating furnace further comprises a front chamber in which the porous preform is kept and inserted in or removed from the muffle tube and the front chamber is heated up to 800° C. and evacuated down to $10^{-2}$ Torr.

10. The method according to claim 8, wherein the nitrogen permeability of the silicon carbide is $10^{-6}$ $cm^2$/sec. or less.

* * * * *